Dec. 30, 1947.  C. P. HEINTZE  2,433,553
SPEED RESPONSIVE CONTROLLED ONE-WAY ENGAGING CLUTCH
Filed April 12, 1946
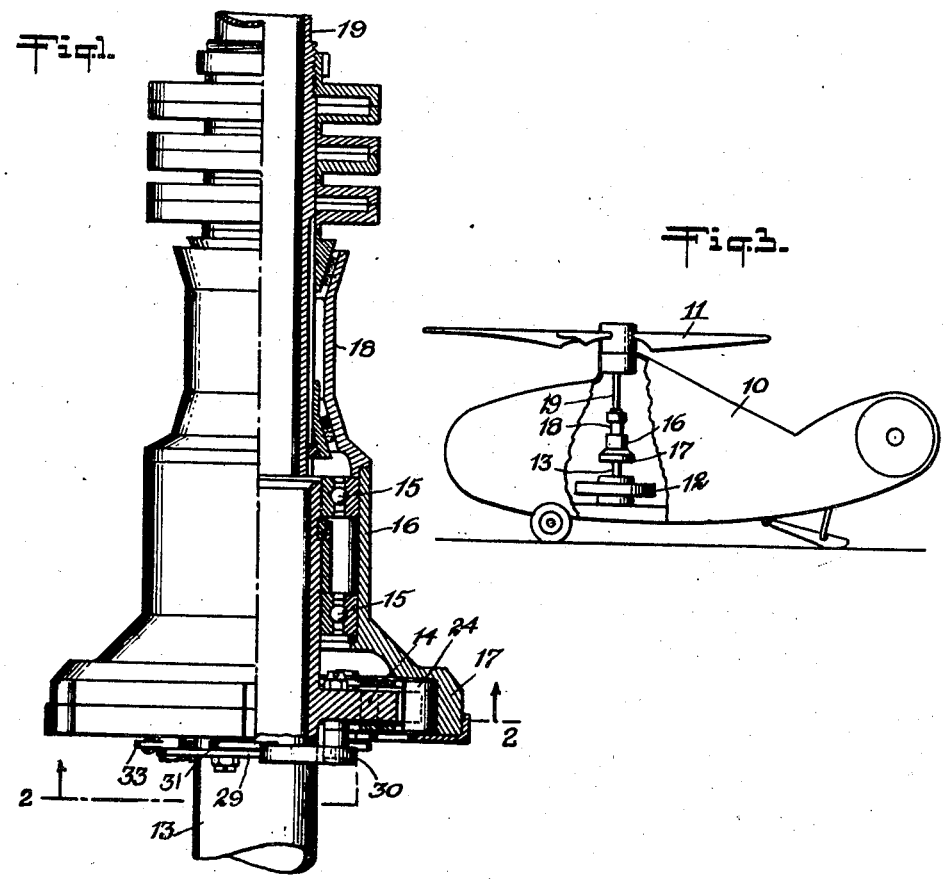
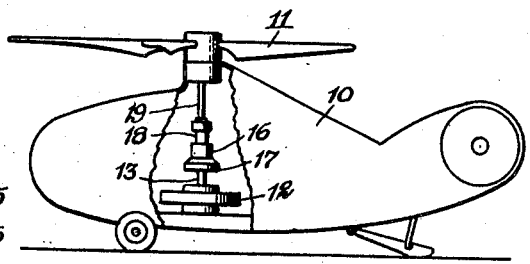
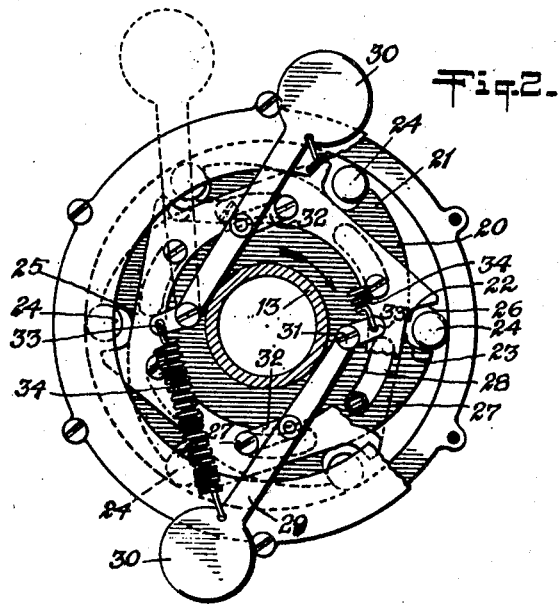
INVENTOR.
Carl P. Heintze
BY
Munn, Liddy & Glaccum
Attorneys Patented Dec. 30, 1947

2,433,553

UNITED STATES PATENT OFFICE 2,433,553

SPEED RESPONSIVE CONTROLLED ONE-WAY ENGAGING CLUTCH

Carl P. Heintze, Amityville, N. Y.

Application April 12, 1946, Serial No. 661,612

3 Claims. (Cl. 192—103)

1

This invention relates to new and useful improvements in drive mechanisms and has especial reference to one adapted for use in driving the rotors of helicopters and permitting a free-wheeling action thereto.

An object of the invention is to reduce the number of parts required to produce this free-wheeling action and to reduce the chance of mechanical helicopter failure.

A further object is to reduce the consumption of helicopter lift capacity for acquisition of clutch effects by the reduction of the clutch weight which at present is relatively very large.

A further object is to provide a simple, rugged, efficient combination of parts which will automatically connect the rotor with the drive shaft when the speed of the engine gets above a predetermined value and will automatically make a disconnection therebetween either when the motor speed falls too low or the rotor speed gets too much above that of the engine.

Further and more specific objects, features and advantages will more clearly appear from a consideration of the specification hereinafter set forth especially when taken in connection with the accompanying drawings which illustrate a present preferred form which the invention may assume and which form part of the specification.

Briefly and in the most general terms, the invention comprises a driving disk, a driven ring around the disk, rollers therebetween and disposed to be forced against the ring by cam surfaces on the periphery of the disk, means such as cooperating shoulders to hold the rollers normally at the low points on the cam surfaces so as to be out of driving contact with the ring, and centrifugally operated means moving with the disk to release the shoulders from the rollers above a definite speed of the drive shaft so that the rollers can be forced by the cam high points into driving contact with the ring.

The present preferred form which the invention may assume is illustrated in the drawings, of which, Fig. 1 is a side elevation of the device with the right half in vertical section;

Fig. 2 is a horizontal section taken on the line 2—2 of Fig. 1; and,

Fig. 3 is an elevation, broken away, of a helicopter employing the invention.

The preferred present form which the invention may assume, is shown in the drawings and has to do with the provision of a free-wheeling clutch disposed in a helicopter 10, between the rotor blades 11 and the engine 12, as generally indicated in Fig. 1.

In the form shown the engine has a vertically disposed shaft 13 driving a disk 14 connected thereto in any suitable manner. In the form shown the disk is formed integral with the shaft.

2

The upper end of the shaft 13 is journalled in bearings 15. Surrounding the shaft 13 is a hollow cylinder 16 the lower end of which is preferably flared out in the form of a ring 17 concentrically disposed with respect to the shaft 13. The shaft 13 constitutes the driving member, the ring 17 the driven member connected to the cylinder 16 which in turn is connected through a well known overload clutch 18 which in turn connects to the driven shaft 19 to the upper end of which the helicopter rotor 11 is connected.

In order for the shaft 13 to drive the cylinder ring or shell 17 the following construction is provided as now preferred:—

The periphery of the disk 14 is provided with several sloping cam surfaces 20 having naturally high points 21 and low points 22. This configuration naturally results in a series of shoulders 23 formed on the periphery of the cams between the high point of one surface and the low point of the next one.

Disposed between the periphery of the disk 14 and the ring 17 with respect to the cam surfaces are rollers 24 the ends of which extend on each end beyond the sides of the disk 14. It is of course obvious that when the rollers 24 lie in the low points of the cam surfaces, then they do not exercise any particular driving friction against the inner adjacent surface of the ring 17 and consequently do not tend to drive the cylinder 16 and the shaft 19 as much as when they are permitted to move relatively to the cam surface so that they are forced firmly against the ring surface by the high points of the cams.

Means are provided to hold the rollers in the low points or spots of the cam surfaces and in the preferred form shown herein this construction is as follows:

A pair of ring plates 25 are disposed on opposite sides of the disk 14 provided with spaced extensions forming shoulders 26 normally disposed somewhat apart from the shoulders 23 above mentioned on the disk cam surface and between these two shoulders the rollers 24 are under normal conditions held at the low portion of the peripheral cam surface of the disk 14. These ring plates 25 are connected by a series of bolts 27 extending from one plate to the other through concentric slots 28 formed in the disk 14. These ring plates 25 are adapted to be moved from the so-called holding position to one in which the rollers 24 are released for movement relative to the cam surfaces by means of centrifugally operated elements preferably arms 29 having weights 30 at their outer ends and pivoted at 31 to the sides of the disk 14. These arms are connected in any suitable manner to short links 32 which are in turn connected to the bolts 27 joining the ring plates 25. Thus it will be seen that as, under speed influences, the arms tend to swing outwardly, the bolts 27 are moved along the slots 28 and thus rotate the ring plates 25 and thus remove the shoulders 26 from their normal holding position in restraint of the movement of the rollers 24. This releasing action takes place only after the shaft 13 has reached a determined minimum speed which is defined by the calculated resistance of springs 34 connected at one end to the arms 29 and at the other ends to a short arm 33 adjacent the pivot point 31 of the other arm. Thus the arms will not swing out until the speed of the shaft 13 has attained a desired amount and therefore the rollers 24 will not be forced by the cam high points against the inner surface of the ring 17 until that speed at least has been reached. Any speed below that amount will find the rollers still confined by the shoulders 23 and 26. Thus a sort of free-wheeling action takes place with respect to the driving of the helicopter rotor 11 which will not be picked up until the drive shaft has been speeded up a predetermined amount and will automatically be disconnected therefrom when the speed drops below that definite amount. This disconnection will also take place at any time that the speed of rotation of the rotor 11 exceeds the speed of the motor shaft 13.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

What I claim as my invention is:

1. In a device of the class described, a driving disk, a driven ring concentric with said disk, the periphery of the disk having cam surfaces thereon with high and low points and shoulders adjacent the low points, rollers disposed between the disk and the ring, a shouldered ring movable relative to the disk and having shoulders thereon opposed to and spaced from those on the disk, said shoulders normally confining the rollers between them at the low points of the cams, and centrifugally operated means mounted on the disk and connected to the shouldered ring to effect its movement relative to the disk when the speed of the disk exceeds a definite value whereby the shoulders are moved apart and the rollers released from confinement.

2. In a device of the class described, a driving disk having a periphery formed with a series of cam surfaces having high and low points with shoulders between the high points of one cam surface and the low points of the adjacent cam surface, said shoulders facing in one direction, a driven ring concentric with said disk, rollers disposed between the periphery of the disk and the concentric driven ring and normally disposed at the low points on said cam surfaces, the ends of said rollers extending beyond the sides of the disk, shouldered rings disposed at the sides of the disk, the shoulders thereon facing those on the disk and confining normally the rollers therebetween at the low points, and means on and movable with the disk and connected to the shouldered rings and responsive to centrifugal force to move said shouldered rings relative to the disk to release the confinement of the rollers.

3. In a device of the class described, a driving disk having a periphery formed with a series of cam surfaces having high and low points with shoulders between the high points of one cam surface and the low points of the adjacent cam surface, said shoulders facing in one direction, a driven ring concentric with said disk, rollers disposed between the periphery of the disk and the concentric driven ring, and normally disposed at the low points on said cam surfaces, the ends of said rollers extending beyond the sides of the disk, shouldered rings disposed at the sides of the disk with shoulders thereon facing those on the disk and confining normally the rollers therebetween at the low points, said disk having concentric slots therein, bolts in said slots and connecting said shouldered rings, arms pivoted to said disk, weights on the ends of said arms, links connecting said arms to one of said shouldered rings, springs connected to the arms to resist change in their position, said arms adapted to change their position due to centrifugal force and move the shouldered rings whereby the rollers are released from their confinement.

CARL P. HEINTZE.

REFERENCES CITED

The following references are of record in the file of this patent:

UNITED STATES PATENTS

| Number | Name | Date |
|---|---|---|
| 1,499,115 | May | June 24, 1924 |
| 1,937,211 | Vondra | Nov. 28, 1933 |
| 2,044,197 | Barthel | June 16, 1936 |

FOREIGN PATENTS

| Number | Country | Date |
|---|---|---|
| 696,895 | Germany | Oct. 2, 1940 |